United States Patent
Klassen et al.

(10) Patent No.: US 6,535,635 B1
(45) Date of Patent: Mar. 18, 2003

(54) ERROR CLIPPING FOR VECTOR ERROR DIFFUSION

(75) Inventors: R. Victor Klassen, Webster, NY (US); Brian Waldron, Penfield, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/426,329

(22) Filed: Oct. 25, 1999

(51) Int. Cl.⁷ .................................................. G06K 9/00
(52) U.S. Cl. ........................ 382/167; 382/275; 382/305; 358/448; 358/518
(58) Field of Search ............................ 382/167, 252, 382/253, 275, 305, 307, 162, 304; 358/465, 466, 448, 443, 536, 518, 1.1, 1.9, 1.16, 3.05, 3.03; 345/600, 589

(56) References Cited

U.S. PATENT DOCUMENTS

| | | | |
|---|---|---|---|
| 5,070,413 A | 12/1991 | Sullivan et al. | 358/456 |
| 5,087,981 A | 2/1992 | Ng et al. | 358/459 |
| 5,432,893 A | 7/1995 | Blasubramanian et al. | 395/131 |
| 5,561,751 A | 10/1996 | Wong | 395/131 |
| 5,594,558 A | 1/1997 | Usami et al. | 358/518 |
| 5,621,545 A * | 4/1997 | Motta et al. | 358/1.9 |
| 5,621,546 A | 4/1997 | Klassen et al. | 358/1.9 |
| 5,982,992 A * | 11/1999 | Waldron | 358/1.9 |
| 6,062,137 A * | 5/2000 | Guo et al. | 101/171 |
| 6,081,344 A * | 6/2000 | Bockman et al. | 358/1.16 |
| 6,178,008 B1 * | 1/2001 | Bockman et al. | 358/1.1 |
| 6,327,391 B1 * | 12/2001 | Ohnishi et al. | 382/236 |

* cited by examiner

*Primary Examiner*—Jayanti K. Patel
*Assistant Examiner*—Ali Bayat
(74) *Attorney, Agent, or Firm*—Kevin J. Canning; Philip E. Blair

(57) ABSTRACT

An error diffusion technique seeks to remove artifacts resulting from the diffusion of large errors. This technique removes artifacts resulting from instances where there is little difference between a source color and a target color but there is a large diffused error component. The error diffusion technique clips a combination vector resulting from the combination of a source color with the diffused error component so that the combination vector extends roughly one quarter of the width of a color gamut beyond the boundary of the color gamut. This helps to prevent ever-increasing error vectors and, thus, helps prevent certain artifacts in images that are output.

14 Claims, 4 Drawing Sheets

FIG. 5
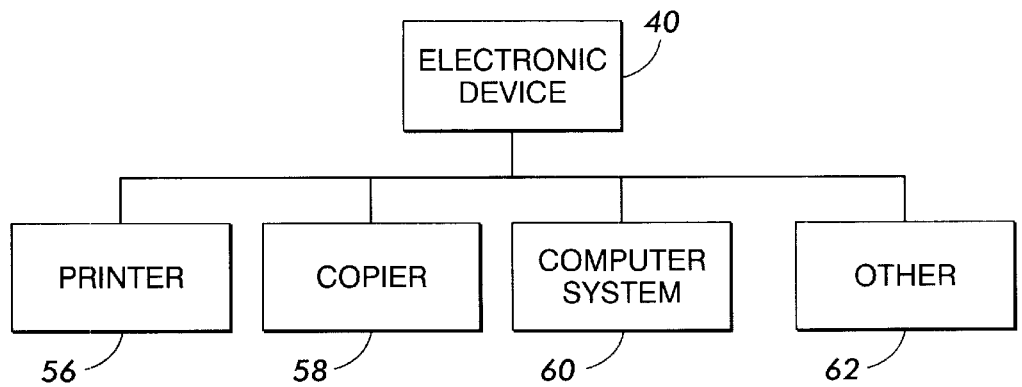
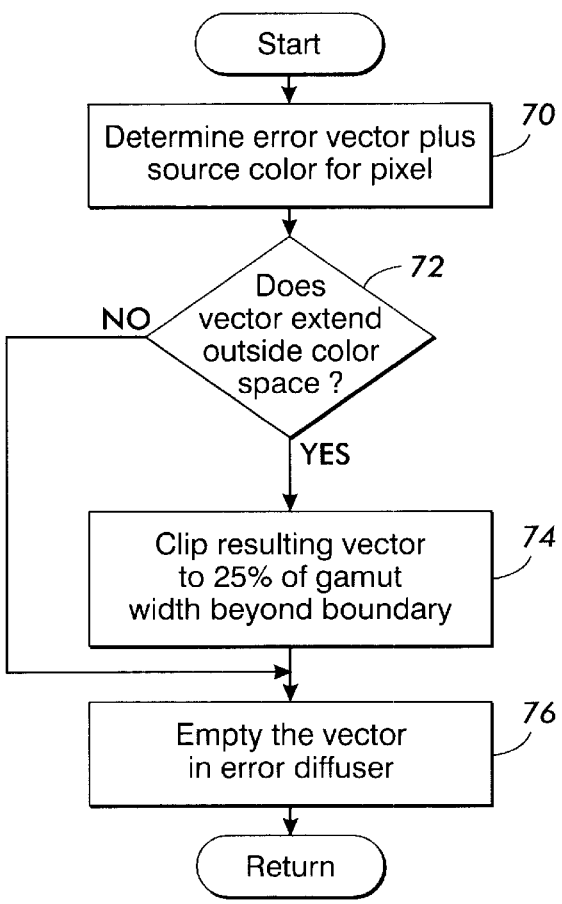
FIG. 6

ERROR CLIPPING FOR VECTOR ERROR DIFFUSION

RELATED APPLICATIONS

This application is related to U.S. application Ser. No. 08/924,734 filed on Sep. 5, 1997, entitled "Error Diffusion on Moderate Numbers of Output Colors" and U.S. application Ser. No. 09/140,219 filed on Aug. 26, 1998, entitled "Error Diffusion in Color Printing Where an Intra-Gamut Colorant is Available." The entire contents of each of said application is hereby incorporated by reference.

TECHNICAL FIELD

The technical field of the present invention relates generally to image processing and more particularly to error clipping for vector error diffusion.

BACKGROUND OF THE INVENTION

Color digital printing devices typically employ only a small set of colorants. For example, many digital color-printing devices employ only black, yellow, magenta and cyan colorants. These colorants are placed on a printing substrate to optically blend together to create a large range of colors. Yellow, magenta and cyan are subtractive colorants that filter out colors in order to produce a desired color. Other digital color devices employ additive colors, such as red, green and blue, that additively combine to produce a desired color. The range of colors that may be produced from a set of colorants forms a "color gamut."

Digital color printing devices often employ "digital halftoning" techniques. These techniques attempt to approximate a continuous tone image using a limited subset of colorants that are displayed for pixels of the image. For each pixel in the image, the halftone representation may not match the original tone for the image. As a result, the halftone image has an element of error at the pixel. Hence, a number of different techniques have been introduced to seek to reduce the amount of error and reduce the amount of noise that is visible in an image.

Error diffusion is one of the techniques that has been employed to attempt to reduce the amount of error or noise in an image where digital halftoning is employed. Error diffusion seeks to diffuse an error for a given pixel among neighboring pixels so as to compensate for the error. An example is helpful to illustrate the operation of error diffusion. FIG. 1 depicts a portion of an image containing two rows of pixels: row 1 and row 2. The pixels are ordered from left to right on a row by row basis. Row 1 contains pixels P1, P2, P3 and P4, and row 2 contains pixels P5, P6, P7 and P8. Suppose that pixel P1 is represented by an output color that differs from the source color (i.e. the desired color from the image). The error representing the difference between the output color and the source color is diffused to neighboring pixels P2, P5 and P6 (as indicated by the arrows in FIG. 1). In particular, the error vector for pixel P1 may be multiplied by respective weights and then added to source colors for the pixels P2, P5 and P6. In an ideal case, the weights sum to a value of 1.

Unfortunately, certain artifacts and problems can arise when error diffusion is applied. These problems and artifacts may result in noise in the resulting image.

SUMMARY OF THE INVENTION

The present invention provides an innovative approach to error diffusion that eliminates some of the problems that may occur with conventional error diffusion techniques. In one embodiment of the present invention, error vectors are diffused to neighboring pixels as part of an error diffusion technique. The combination of the error vector with the source color is clipped so that the combination does not significantly extend beyond a color gamut boundary. The combination may be clipped so that it does not extend any greater than 25% of the width of the color gamut beyond the boundary of the color gamut.

In accordance with a further aspect of the present invention, a method for processing an image is practiced in an electronic device. In accordance with this method, an error vector is provided that represents a portion of an error between a desired color for a first pixel and a first output color for the first pixel that is output on an output device. The error vector is added to a source color for a second pixel to produce a resulting vector that extends beyond a color space by a given length to a terminating point. The resulting vector is clipped so that the resulting vector is shortened to less than the given length. The terminating point at the resulting vector, still, however, lies outside the color space. A second output color is determined for the second pixel. The second output color is a selected one of the output colors that is a shortest distance in the color space from the terminating point of resulting vector.

In accordance with another aspect of the present invention, an electronic device includes a storage that holds image data for pixels in an image. The electronic device may be a computer system, a printer or other type of output device. The electronic device includes a processor for processing an error vector. The error vector represents at least a portion of the error between a source color for a first of the pixels and an output color for the first of the pixels. The processor processes the error vector to add the error vector to a source color for a second of the pixels to produce a resulting vector that extends outside the color space. The processor clips the resulting vector so that the resulting vector is shortened but still lies outside the color space.

In accordance with an additional aspect of the present invention, a method of processing image data for an image that is to be output on an output device is practiced in an electronic apparatus. Per this method, a color cube is provided that represents possible colors for pixels in the image. The color cube includes colorants constituting colors that can be output by the output device. The location of a source color for a first pixel of the image in the color cube is identified. The source color represents a desired color to be output for the first pixel. A determination is made to determine a selected one of the colorants in the color cube that is closest in distance and location on the source color for the first pixel in the color cube. It is determined that the selected colorant is to be output for the first pixel. An error vector is calculated to represent error between the location of the source color for the first pixel in the color cube and the location of the selected colorant in the color cube. The error vector begins at the location of the source color for the first pixel and the color cube and has a length equal to a magnitude of the error and a direction opposite to a vector that extends from the location of the source color for the first pixel towards the location of the selected color in the color cube. Where a sum of a source color for a second pixel in the image and the error vector extends outside the color cube, the sum is clipped to produce a sum clipped source vector that extends outside the color cube. The clipped source vector still extends more than negligibly beyond the color cube. The clipped source vector is employed in deciding which of the colorants to output for the second pixel.

BRIEF DESCRIPTION OF THE DRAWINGS

An illustrative embodiment of the present invention will be described below relative to the following drawings.

FIG. 5 illustrates a number of different types of electronic devices that may be used in practicing the illustrative embodiment.

FIG. 6 is a flow chart illustrating the steps that are performed in practicing the illustrative embodiment to clip vectors so as to prevent increasing errors.

DETAILED DESCRIPTION OF THE INVENTION

The illustrative embodiment of the present invention provides an approach to clipping the vector resulting from adding an error component to a source color so that the vector is one quarter of the width of the color gamut beyond the boundary of the color gamut. This clipping prevents diffused error components from increasing to extend greater and greater lengths beyond the color gamut boundary. Hence, the illustrative embodiment helps to decrease error and the resulting associated visible noise.

The illustrative embodiment recognizes that when target colors include a small number of colorants inside a color gamut rather than on the surface of the color gamut, errors occasionally grow too large and result in artifacts that are visible in the associated image. This may result in extreme artifacts in some cases. One such case is where large errors are not produced as a result of source color/target color differences but the error results primarily from the diffusion of large errors.

Figure 1:
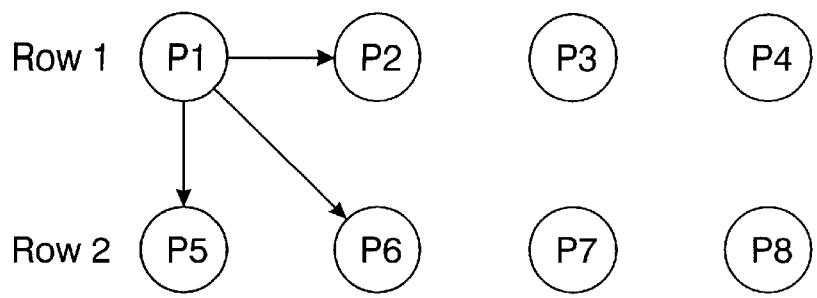
FIG. 1 illustrates an example of a pattern of error diffusion among pixels in accordance with a conventional error diffusion approach.
Figure 2:
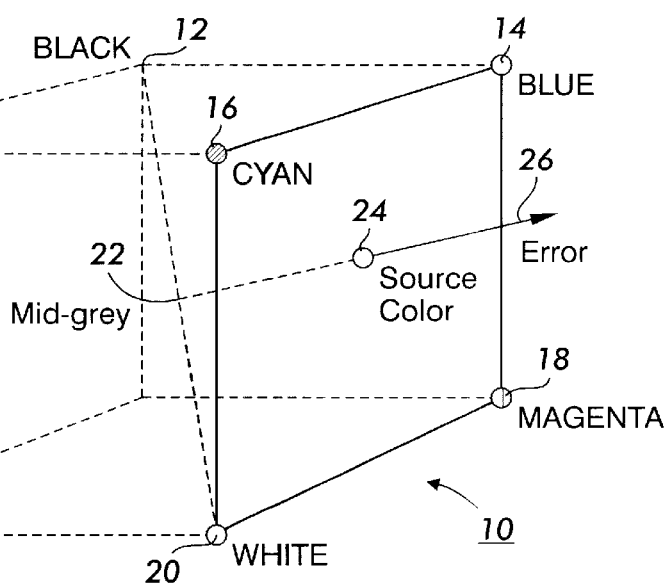
FIG. 2 illustrates an example of error diffusion in a conventional system.

In order to appreciate an instance wherein the illustrative embodiment is useful it is helpful to consider an example. FIG. 2 depicts a color gamut 10 represented as a color cube. Colorants that may be employed are located on the vertices of the color cube and at selected intra-gamut locations. The colorants in FIG. 2 are black 12, blue 14, cyan 16, magenta 18, white 20 and mid-gray 22 (which is positioned at the midpoint along a diagonal that extends from black 12 to white 10). The "colorants" are colors that may be output directly by an output device. The other colors in the color gamut represent possible colors in a source image. FIG. 2 depicts an example where a source color 24 for a pixel is found near the center of the face of a color cube. Mid-gray 22 is the closest target color or colorant for the source color 24 of FIG. 2. In this example case, the source color 24 is a fully saturated light greenish blue. Error vector 26 represents the error between the source color and the target color (mid-gray 22). The error vector 26 has a length equal to the distance from the source color 24 to mid-gray 22 but opposite direction.

Figure 3:
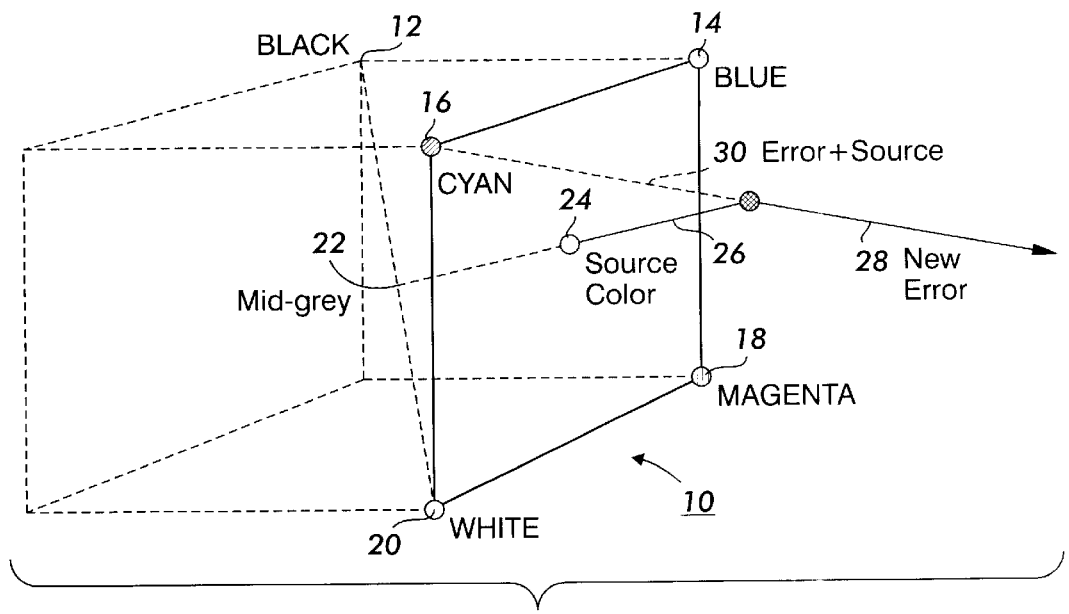
FIG. 3 illustrates an example of how conventional error confusion can result in a continually increasing error.

FIG. 3 shows an instance wherein no clipping is performed. The source color 24 has the error vector 26 added to it to produce a resulting vector 30. In error diffusion, the error is diffused so that the source color is combined with the diffused error to determine the target color. The new error is calculated by identifying the difference between the source color combined with the diffused error and the target color. Cyan 16 is the closest target color to the resulting vector 30. The new error vector 28 is larger and extends significantly beyond the boundary of the color gamut 10. As will be described in more detail below, the illustrative embodiment clips the resulting vector 30 to one quarter of the color gamut width so that the error does not escalate subsequently with pixels that are later processed.

Figure 4:
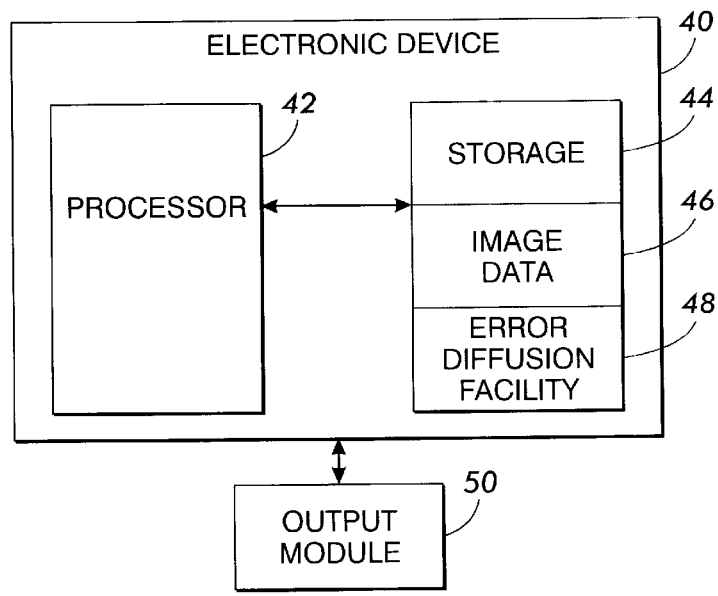
FIG. 4 depicts a system that is suitable for practicing the illustrative embodiment of the present invention.

FIG. 4 depicts an electronic device 40 and output module 50 that are suitable for practicing the illustrative embodiment of the present invention. The electronic device may take many forms. FIG. 5 depicts a number of the different options that are available for the electronic device in practicing the present invention. The electronic device may be a printer 56 or a copier 58. In addition, the electronic device may be a computer system 60. Those skilled in the art will appreciate that the electronic device 40 may also be other types of devices 62.

With respect to FIG. 4, it is presumed that the electronic device 40 communicates with an output module 50 for outputting an image. The output module 50 may be integrated into the electronic device 40 or may be a separate component. The output module 50 may be, for instance, a printer, a plotter, a video display device, or other type of output device. The electronic device 40 includes a processor 42, such as a conventional microprocessor. The processor 42 interacts with a storage 44 that may include both primary storage and secondary storage. The storage 44 may include computer readable media that hold instructions and data for use by the processor 42. The storage may include, for example, removable magnetic disk media and optical media. The storage 44 holds image data 46 for an image or a portion of an image. The storage 44 also holds an error diffusion facility 48 that performs the error diffusion described herein relative to the illustrative embodiment of the present invention. The instructions contained within the error diffusion facility 48 are executed by the processor 42.

Those skilled in the art will appreciate that the configuration shown in FIG. 4 is intended to be merely illustrative and not limiting of the present invention. Moreover, the electronic device 40 may be in communication with remote computing resources, such as found in local area networks, wide area networks or via modem communication.

Figure 7:
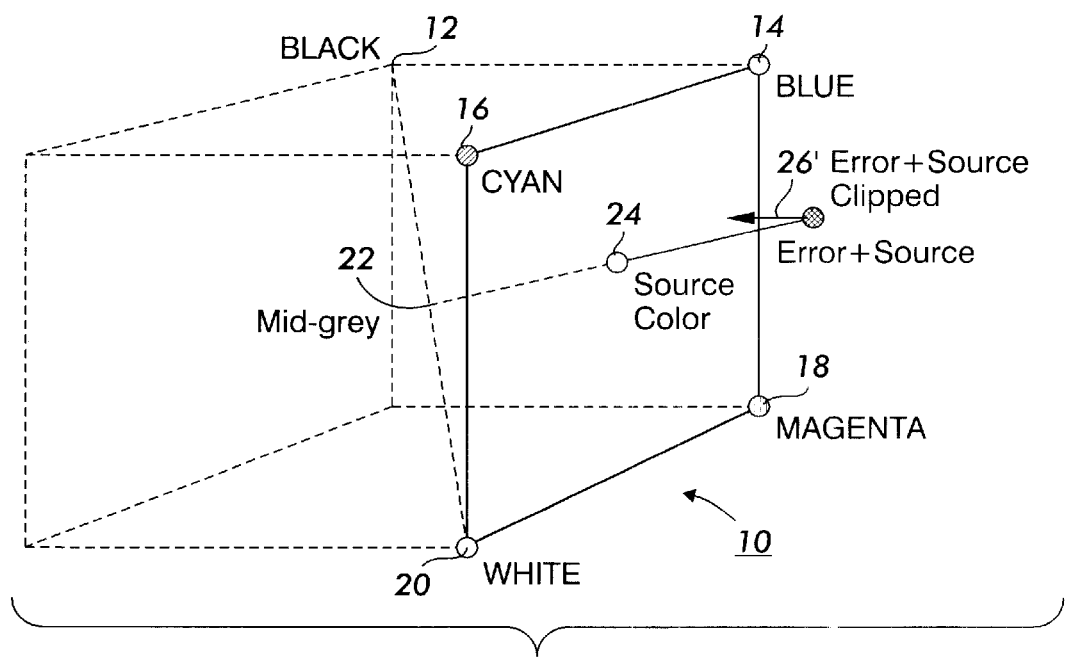
FIG. 7 illustrates an example of the result of performing clipping in the illustrative embodiment.

FIG. 6 is a flow chart illustrating the steps that are performed in the illustrative embodiment. Initially, for a given pixel, a determination is made of a source color (representing the desired color to be output for the input image) and an error vector (step 70 in FIG. 6). A determination is made whether the vector that results from adding the error component to the source color extends outside of the color gamut (step 72 in FIG. 6). If the resulting vector extends outside of the color gamut, the resulting vector is clipped to 25% of the gamut width beyond the boundary of the color gamut (step 74 in FIG. 6). FIG. 7 shows an example of such clipping. The resulting vector 26' has been clipped.

The clipped vector is then employed in error diffusion as the combination of source and error (step 76 in FIG. 6). In other words, the resulting vector 26' serves as the target color to which the closest matching colorant is applied. The chosen colorant may then be output for the pixel on the output module 50. This process may then be repeated for the remaining pixels in the image. The clipping results in less error and thus avoids large artifacts, resulting from significant errors being diffused.

While the present invention has been described with reference to an illustrative embodiment thereof, those skilled in the art will appreciate that various changes in form and detail may be made without departing from the intended scope of the present invention as defined in the appended claims.

What is claimed is:

1. In an electronic device, a method of processing an image comprising:

provided a bounded color space, said color space having width;

providing an error vector which represents an error between a desired color for a first pixel and a first output color;

adding said error vector to a source color for a second pixel to produce a resulting vector which extends beyond said color space boundary;

clipping said resulting vector so that it has an endpoint which extends approximately 25% of said width beyond said color space boundary; and determining a second output color for said second pixel corresponding to the shortest distance in said color space between said second output color and said endpoint of said clipped resulting vector.

2. The method of claim 1, wherein the color space is a color cube.

3. The method of claim 2, wherein the color cube includes cyan and magenta on vertices of the color cube as output colors that may be output by the output device.

4. The method of claim 1, wherein the electronic device is a computer system.

5. The method of claim 1, wherein the electronic device is a printer.

6. In an electronic device, a medium holding instructions for execution by an electronic device for performing a method of processing an image comprising:

providing a bounded color space, said color space having width;

providing an error vector which represents an error between a desired color for a first pixel and a first output color;

adding said error vector to a source color for a second pixel to produce a resulting vector which extends beyond said color space boundary;

clipping said resulting vector so that it has an endpoint which extends approximately 25% of said width beyond said color space boundary; and determining a second output color for the second pixel corresponding to the shortest distance in said color space between said second output color and said endpoint of said clipped resulting vector.

7. The medium of claim 6, wherein the color space is a color cube.

8. An electronic device comprising:

a storage holding image data for pixels in an image; and a processor for performing the steps of:

providing a bounded color space, said color space having width;

providing an error vector which represents an error between a desired color for a first pixel and a first output color;

adding said error vector to a source color for a second pixel to produce a resulting vector which extends beyond said color space boundary;

clipping said resulting vector so that it has an endpoint which extends approximately 25% of said width beyond said color space boundary; and determining a second output color for said second pixel corresponding to the shortest distance in said color space between said second output color and said endpoint of said clipped resulting vector.

9. The electronic device of claim 8, wherein the processor further comprises an error diffuser for employing the error vector as clipped in error diffusion that is applied to the image data.

10. The electronic device of claim 8, wherein the device is a printer.

11. The electronic device of claim 8, wherein the device is a copier.

12. The electronic device of claim 8, wherein the device is a computer system.

13. In an electronic apparatus, a method of processing image data for an image that is to be output on an output device, comprising the steps of:

providing a color cube that represents possible colors for pixels in the image, said color cube including colorants constituting a subset of colors that can be output on the output device, wherein said color cube has a width;

identifying a location of a source color for a first pixel of the image in the color cube, wherein the source color represents a desired color to be output for the first pixel;

determining a selected one of the colorants in the color cube that is closest in distance to the location of the source color for the first pixel in the color cube;

determining that the selected colorant is to be output for the first pixel;

calculating an error vector representing error between the location of the source color for the first pixel in the color cube and a location of the selected colorant in the color cube, wherein said error vector begins at the location of the source color for the first pixel in the color cube, has a length equal to a magnitude of the error and has a direction opposite to a vector that extends from the location of the source color for the first pixel toward the location of the selected colorant in the color cube;

where a sum of a source color for a second pixel in the image and the error vector extends outside the color cube, (i) clipping the sum to produce a sum clipped source vector that extends outside the color cube by roughly one quarter of the width of the color cube; and (ii) employing the clipped source vector in deciding which of the colorants to output for the second pixel.

14. The method of claim 13 wherein the electronic apparatus is an image output device.

* * * * *